(12) United States Patent
Nachshon et al.

(10) Patent No.: US 10,867,507 B2
(45) Date of Patent: Dec. 15, 2020

(54) SET-TOP BOX GATEWAY ARCHITECTURE FOR UNIVERSAL REMOTE CONTROLLER

(71) Applicant: Sure Universal Ltd., Ramat Gan (IL)

(72) Inventors: Nadav Nachshon, Tel Aviv (IL); Baraa Hleihil, Jish (IL); Ofer Rotschield, Kiryat Ono (IL); Viktor Ariel, Modi'in (IL); Max Kholmyansky, Ramat Gan (IL); Vadim Lanzman, Petach Tikva (IL)

(73) Assignee: Sure Universal Ltd., Ramat Gan (IL)

( * ) Notice: Subject to any disclaimer, the term of this patent is extended or adjusted under 35 U.S.C. 154(b) by 0 days.

(21) Appl. No.: 16/036,060

(22) Filed: Jul. 16, 2018

(65) Prior Publication Data

US 2019/0019402 A1 Jan. 17, 2019

Related U.S. Application Data

(60) Provisional application No. 62/533,059, filed on Jul. 16, 2017.

(51) Int. Cl.
*G08C 17/00* (2006.01)
*H04L 12/66* (2006.01)
(Continued)

(52) U.S. Cl.
CPC .......... *G08C 17/00* (2013.01); *H04L 12/2816* (2013.01); *H04L 12/2832* (2013.01);
(Continued)

(58) Field of Classification Search
None
See application file for complete search history.

(56) References Cited

U.S. PATENT DOCUMENTS

| | | | |
|---|---|---|---|
| 7,130,629 B1* | 10/2006 | Leung | H04W 80/04 455/435.1 |
| 9,842,491 B2* | 12/2017 | Ariel | A63F 13/86 |

(Continued)

OTHER PUBLICATIONS

International Search Report for corresponding PCT application PCT/IB2018/055256 dated Nov. 5, 2018.
(Continued)

*Primary Examiner* — Carlos Garcia
(74) *Attorney, Agent, or Firm* — Heidi Brun Associates Ltd.

(57) ABSTRACT

A system for controlling IoT devices in a premises includes at least one mobile universal remote controller (MURC) implemented on a mobile device to receive user instructions to at least one of the IoT devices, a gateway and an IoT device server. The gateway is implemented in a unit having a connection to a data network and having multiple communication units connected therein. The gateway has agents, one per type of communication protocol, to communicate with the IoT devices each according to its associated communication protocol. The IoT device server is connected to the data network and is in communication with the MURC and the gateway. The server passes commands related to the user instructions from the MURC to the gateway to the unit to communicate the commands to the at least one IoT device using associated communication protocols for the at least one IoT device.

18 Claims, 7 Drawing Sheets

(51) Int. Cl.
  H04L 29/08   (2006.01)
  H04L 12/28   (2006.01)
  H04N 21/41   (2011.01)
  H04L 29/06   (2006.01)
  H04N 21/422  (2011.01)

(52) U.S. Cl.
  CPC .............. *H04L 12/66* (2013.01); *H04L 67/12* (2013.01); *H04L 69/18* (2013.01); *H04N 21/4131* (2013.01); *G08C 2201/92* (2013.01); *G08C 2201/93* (2013.01); *H04L 2012/2841* (2013.01); *H04N 21/4126* (2013.01); *H04N 21/42204* (2013.01)

(56) References Cited

U.S. PATENT DOCUMENTS

| | | | | |
|---|---|---|---|---|
| 10,210,368 | B2* | 2/2019 | Barnum | H04Q 9/00 |
| 2009/0141691 | A1* | 6/2009 | Jain | H04W 88/10 |
| | | | | 370/338 |
| 2012/0200400 | A1* | 8/2012 | Arling | G08C 17/02 |
| | | | | 340/12.28 |
| 2013/0052946 | A1* | 2/2013 | Chatterjee | H04W 4/80 |
| | | | | 455/41.1 |
| 2013/0110302 | A1* | 5/2013 | Ferlitsch | H04L 12/2823 |
| | | | | 700/295 |
| 2014/0064735 | A1* | 3/2014 | Thompson | H04B 10/1149 |
| | | | | 398/106 |
| 2014/0129006 | A1* | 5/2014 | Chen | G05B 15/02 |
| | | | | 700/90 |
| 2015/0241984 | A1* | 8/2015 | Itzhaik | G06F 3/017 |
| | | | | 345/173 |
| 2016/0087933 | A1* | 3/2016 | Johnson | H04W 4/70 |
| | | | | 709/245 |
| 2016/0197772 | A1* | 7/2016 | Britt | H04W 4/70 |
| | | | | 370/254 |
| 2016/0226732 | A1* | 8/2016 | Kim | H04L 12/2807 |
| 2016/0366148 | A1* | 12/2016 | Ariel | H04W 12/0806 |
| 2017/0187835 | A1* | 6/2017 | Lim | H04L 43/0805 |
| 2017/0242557 | A1* | 8/2017 | Rotschield | G06F 3/04817 |
| 2018/0095439 | A1* | 4/2018 | Karbasian | G05B 19/0426 |
| 2018/0145945 | A1* | 5/2018 | Gupta Hyde | H04L 43/16 |
| 2018/0368237 | A1* | 12/2018 | Gal | H05B 47/10 |
| 2019/0044826 | A1* | 2/2019 | Flores Guerra | H04L 41/082 |
| 2020/0050753 | A1* | 2/2020 | Davis | G06F 21/6218 |

OTHER PUBLICATIONS

English translation of Abstract and Claims of CN102448202 downloaded at Google Patents on Nov. 18, 2018.

Aloi G et al., "Enabling IoT interoperability through opportunistic smartphone-based mobile gateways". Journal of Network and Computer Applications. Mar. 2017; 81:74-84.

* cited by examiner

ND APPLICATIONS

This application claims priority and benefit from U.S. provisional patent application 62/533,059, filed Jul. 16, 2017, which is incorporated herein by reference.

FIELD OF THE INVENTION

The present invention relates to smart homes generally and to remote control of Internet of Things devices in particular.

BACKGROUND OF THE INVENTION

Smart homes are homes in which the various appliances of a home, such as lights, refrigerators, ovens, air conditioners, televisions, door locks, outlets, sensors (such as smoke detectors, temperature sensors, and water leak detectors), etc., are digitally controlled and/or configured. This can involve being turned on upon a digital request or according to some schedule or calculation.

While the smart home concept has been around for a while, it has received further impetus from the connection of many new devices to the Internet. The latter is now called the "Internet of Things" (IoT) and there are now many IoT devices. Some IoT devices are individually controlled while others connect to a home-wide controller or gateway. Typically, a gateway may control multiple devices according to some plan, calculation or scenario (such as "when someone walks in the door, turn on the lights in the living room along with the radio").

There are several competing standardization efforts for IoT devices, such as OCF (Open Connectivity Foundation), AllJoyn, Z-Wave, Zigbee, etc., and many vendors keep releasing products supporting only their proprietary protocols with their own SDKs (software developer kits). For example, Wulian, Haier, Samsung and Connect all have their own proprietary protocols.

SUMMARY OF THE PRESENT INVENTION

There is therefore provided, in accordance with a preferred embodiment of the present invention, a system for controlling IoT devices in a premises. The system includes at least one mobile universal remote controller (MURC) implemented on a mobile device to receive user instructions to at least one of the IoT devices, a gateway and an IoT device server. The gateway is implemented in a unit having a connection to a data network and having multiple communication units connected therein. The gateway has agents, one per type of communication protocol, to communicate with the IoT devices each according to its associated communication protocol. The IoT device server is connected to the data network and is in communication with the MURC and the gateway. The server passes commands related to the user instructions from the MURC to the gateway and the gateway communicates the commands to the unit to communicate the commands to the at least one IoT device using associated communication protocols for the at least one IoT device.

Further, in accordance with a preferred embodiment of the present invention, the types of communication protocol are at least one of: WiFi, IR (infra-red), BLE, Z-Wave, Zigbee, LoRa and NB-IOT.

Still further, in accordance with a preferred embodiment of the present invention, the multiple communication units are USB (universal serial bus) to RF (radio frequency) communication units.

Moreover, in accordance with a preferred embodiment of the present invention, the MURC also includes communication units to communicate at least via WiFi and IR directly to at least one of the IoT devices.

Further, in accordance with a preferred embodiment of the present invention, the unit is a set-top box, a smart appliance, a router or a device having an Internet connection and a USB connection.

Still further, the commands include at least a type of protocol and a command code.

Moreover, in accordance with a preferred embodiment of the present invention, each of the MURC, gateway and server communicate with each other according to a single protocol, such as the OCF (Open Connectivity) Foundation) standard based protocol.

Further, in accordance with a preferred embodiment of the present invention, each of the MURC, gateway and server communicate with each other according to a single protocol while the gateway communicates with the IoT devices according to a plurality of protocols, at least one of which is not the single protocol.

Still further, in accordance with a preferred embodiment of the present invention, the gateway includes a discovery unit to enable new devices to be controlled by the gateway.

Moreover, in accordance with a preferred embodiment of the present invention, the gateway and the server include scene/rule units to implement activation scenarios for at least one of the IoT devices.

Further, in accordance with a preferred embodiment of the present invention, the gateway, server and MURC include appliance management cores to maintain lists of IoT devices being controlled. The list of the gateway includes IoT devices of the premises, the list of the MURC includes IoT devices of multiple premises where the MURC operates and the list of the server includes IoT devices of a multiplicity of MURCs and gateways.

There is also provided, in accordance with a preferred embodiment of the present invention, a method for controlling IoT devices in a premises. The method includes receiving user instructions to at least one of the IoT devices via a MURC implemented on a mobile device, communicating with the IoT devices each according to its associated communication protocol via a gateway. The gateway is implemented in a unit having a connection to a data network and having multiple communication units connected therein. The gateway also has agents, one per type of communication protocol. The method further includes passing commands related to the user instructions from the MURC to the gateway via an IoT device server connected to the data network and in communication with the MURC and the gateway and the unit communicating the commands from the gateway to the at least one IoT device using associated communication protocols for the at least one IoT device.

Further, in accordance with a preferred embodiment of the present invention, the types of communication protocol are at least one of: WiFi, IR (infra-red), BLE, Z-Wave, Zigbee, LoRa and NB-IOT.

Still further, in accordance with a preferred embodiment of the present invention, the commands include at least a type of protocol and a command code.

Moreover, in accordance with a preferred embodiment of the present invention, the method includes the MURC, gateway and server communicating with each other according to a single protocol, such as the OCF protocol.

Further, in accordance with a preferred embodiment of the present invention, the method includes the MURC, gateway and server communicating with each other according to a single protocol and the gateway communicating with the IoT devices according to a plurality of protocols, at least one of which is not the single protocol.

Still further, in accordance with a preferred embodiment of the present invention, the method includes enabling new devices to be controlled by the gateway.

Moreover, in accordance with a preferred embodiment of the present invention, the method includes the gateway and the server implementing activation scenarios for at least one of the IoT devices.

Finally, in accordance with a preferred embodiment of the present invention, the method includes the gateway, server and MURC including maintaining lists of IoT devices being controlled, where the list of the gateway includes IoT devices of the premises, the lists of the MURC includes IoT devices of multiple premises where the MURC operates and the list of the server includes IoT devices of a multiplicity of MURCs and gateways.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
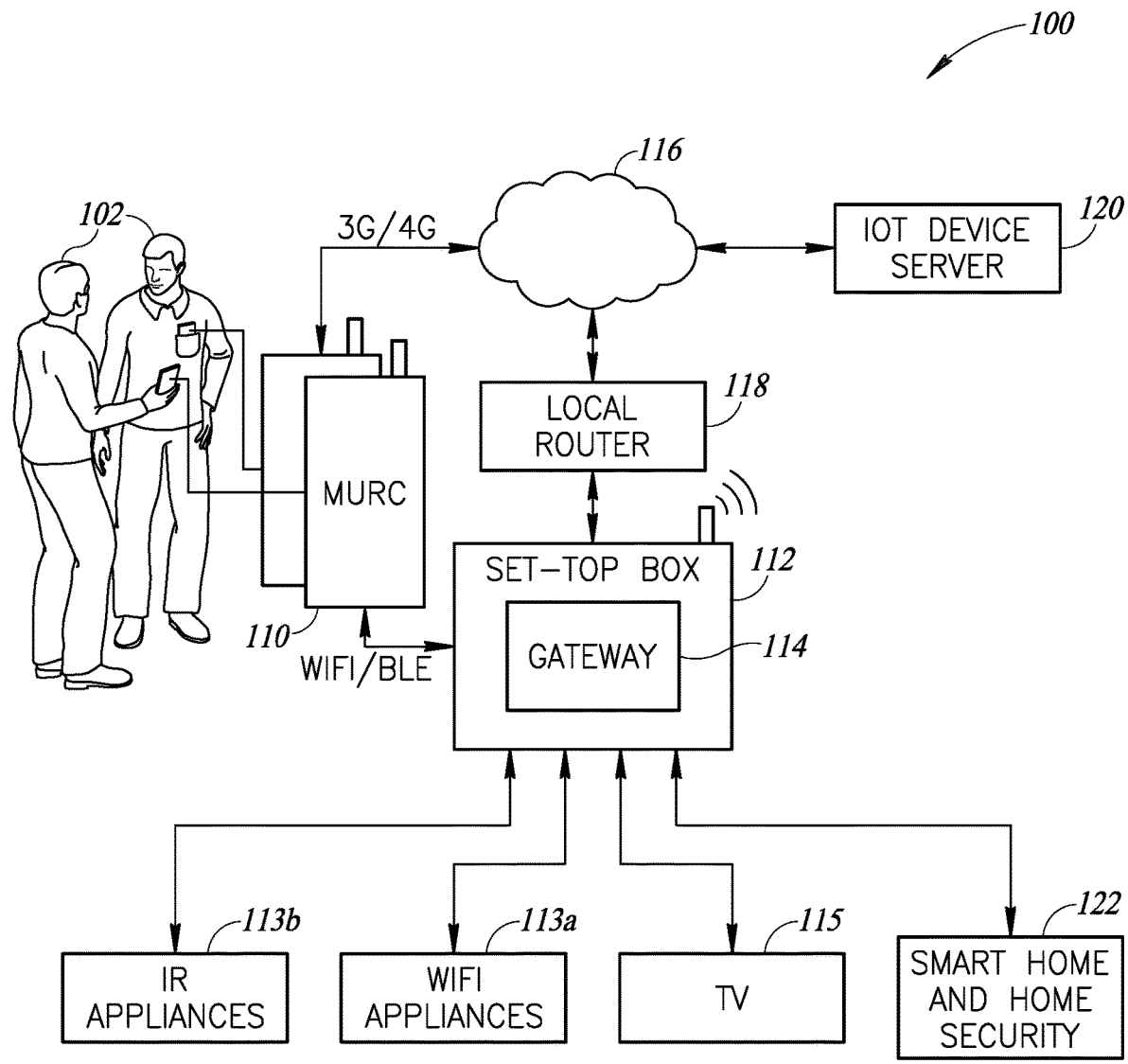
FIG. 1 is a schematic illustration of a smart home system, constructed and operative in accordance with a preferred embodiment of the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE PRESENT INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

Applicant has realized that a smart home may have a plethora of smart devices and the people living in the smart home may be adding new ones all the time. Each device may have its own remote controller and/or may have its own proprietary protocol and/or range of radio frequencies (RF) in which it operates. This may result in a home with a plethora of remote controllers and a multiplicity of gateways for the multiple protocols which, in general, is not desirable.

Applicant has realized that a single, universal remote controller may control all the different types of IoT devices in a home via an IoT gateway implemented in a set-top box, a smart appliance, a router or any device having an Internet connection and a USB (Universal Serial Bus) connection. Applicant has realized that the USB connection enables the set-top box to receive multiple units, each communicating according to the different RF (radio frequency) protocols of smart home devices, thereby enabling the IoT gateway to communicate with the many different types of protocols that a smart home may have.

Moreover, Applicant has realized that, since mobile devices, such as a smartphone, tablet, etc., are so common, a universal remote controller implemented as an application ("app") in a mobile device and communicating with the IoT gateway in the set-top box or other device may enable users to easily implement smart home operation in their homes with such a plethora of different kinds of smart devices.

Reference is now made to FIG. 1, which illustrates a smart home system 100, constructed and operative in accordance with a preferred embodiment of the present invention. Smart home system 100 comprises a mobile universal remote controller (MURC) 110 and a set-top box 112 comprising an IoT (Internet of Things) gateway 114, which may be implemented therein or connected thereto. Set-top box 112 may be connected to a data network 116, such as the Internet, via a local router 118, such as a WiFi router, and smart home system 100 may also comprise an IoT device server 120 connected to data network 116. Set-top box 112 may be a standalone set-top box or may be associated with and/or connected to a particular appliance, such as a television 115.

Figure 2A:
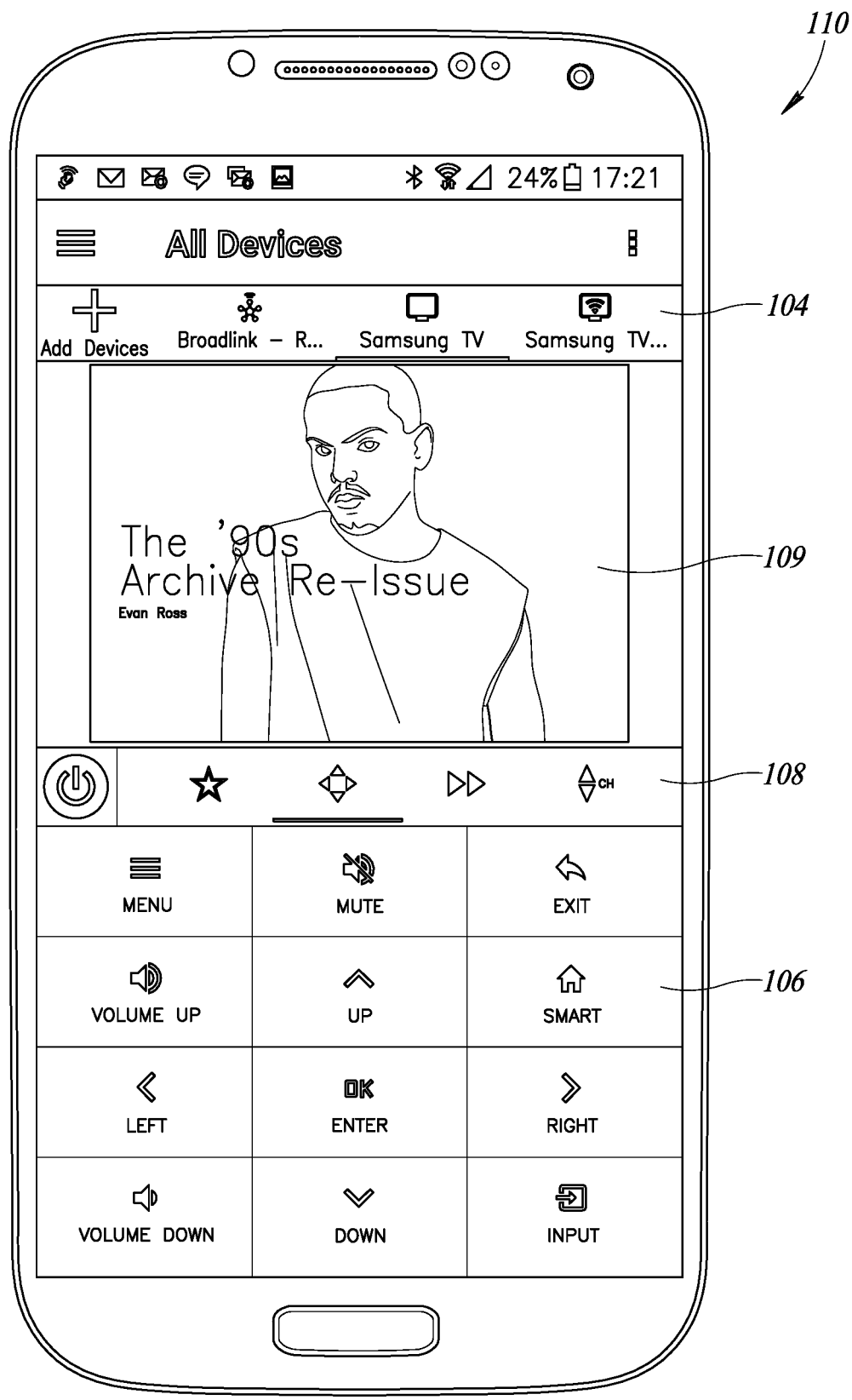
FIGS. 2A and 2B are schematic illustrations of user interfaces of a mobile universal remote controller (MURC), useful in the system of FIG. 1.

The following description will use the term "set-top box" to refer to any suitable device, as described hereinabove, having an Internet connection and a USB connection. MURC 110 may be any suitable universal remote controller implemented on a mobile device. For example, it might be the MURC available from SURE Universal Ltd. of Israel. One exemplary user interface for MURC 110 is shown in FIG. 2A, to which reference is now briefly made. Each end user 102 (FIG. 1) may have the application downloaded on his/her own mobile device and may use it to control the smart home appliances 113 within his/her space, such as a home, an office, etc. Appliances 113 may be WiFi appliances 113a or infrared (IR) controlled devices 113b.

As shown in FIG. 2A, MURC 110 may have multiple sections to its user interface. One section 104, on the top of the user interface, may show breadcrumbs of the multiple types of appliances available to be controlled and may enable the user to add a new appliance to his/her personal list of appliances. Section 104 may also be a device selector and may enable the user to change the appliance currently being controlled (chosen from among those associated with this mobile device).

A second section 106, in the lower middle of the display, may be a device input panel with multiple control buttons and a third section 108 may have standard joystick buttons thereon. The input panel shown in FIG. 2A has the cursor, volume and play related buttons on it. Finally, the user interface may have a device output panel 109 used to provide any output from the device, if such is available.

In addition, each MURC 110 may communicate with an Internet-based server, such as server 120, which may provide information to multiple MURCs 110.

Figure 2B:
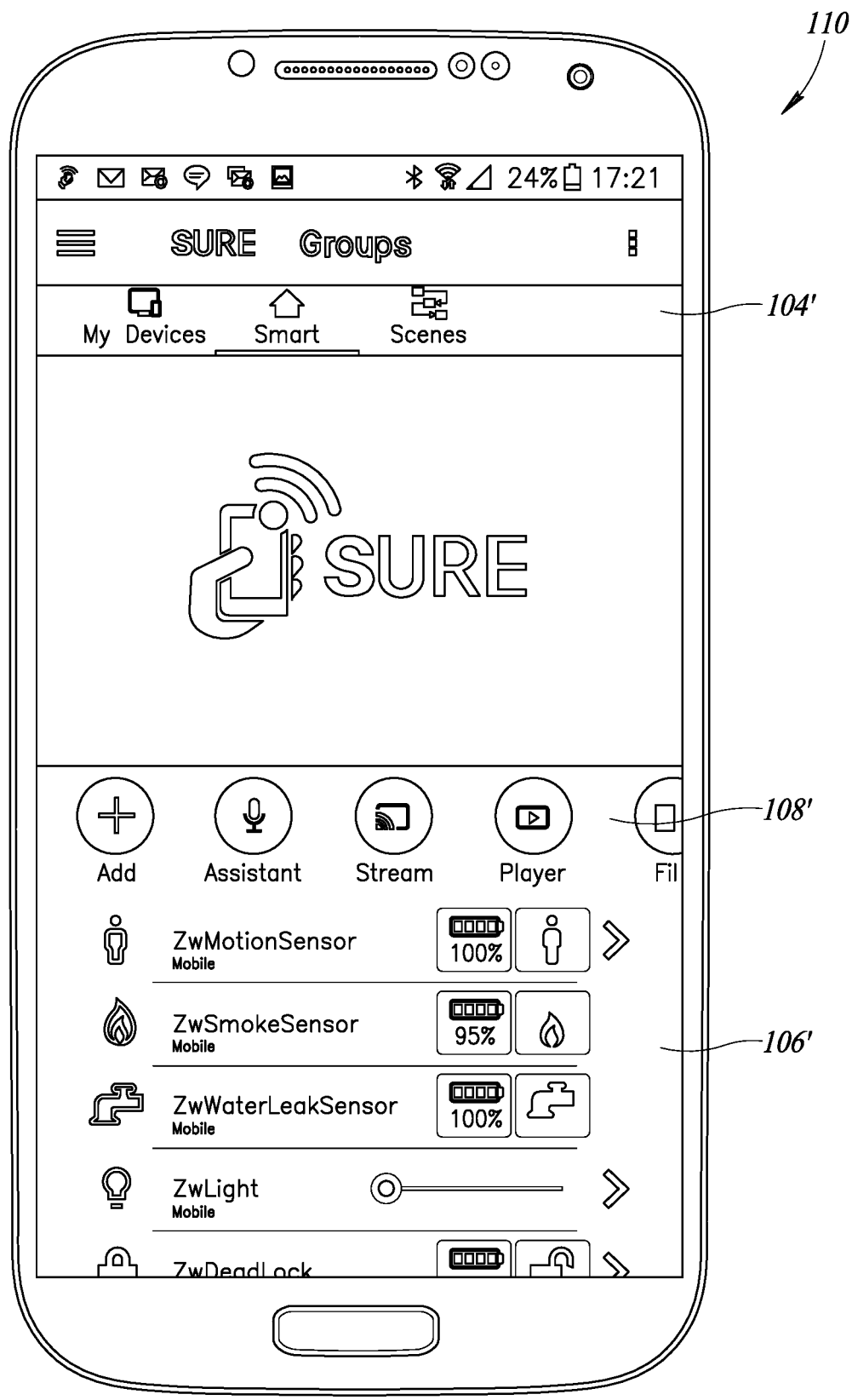

Reference is now briefly made to FIG. 2B, which illustrates a user interface for MURC 110 when operating with gateway 114. In this user interface, the first section, here labeled 104', may provide an input panel for selecting the type of operation to be performed, whether it be to control smart home devices, to develop or run scenes or to operate specific smart appliances, as shown in FIG. 2A. The second section, here labeled 106', may list specific smart home devices which the user may select for activation or configuration. The third section, here labeled 108', may list different operations to perform, such as voice operation of a device, streaming of a video, playing of a video or recording, etc.

As more and more IoT devices are created, they may be registered in a database of IoT device server 120. To do so, a designer may register each instruction of the IoT device and may associate the instruction with a control instruction on one of the input panels of MURC 110.

Returning to FIG. 1, MURC 110 may communicate with set-top box 112 via WiFi or IR and utilizing the BLE (BlueTooth Low Energy) protocol or according to any other suitable communication method. Set-top box 112 may, in turn, communicate with the smart devices, labeled 122, within its vicinity. Typically, set-top box 112 may communicate with devices 122 via WiFi or IR using any suitable protocol, such as BLE, Z-Wave, Zigbee, NB-IOT, etc. If set-top box 112 does not originally have a suitable RF ability, one or more USB-to-RF devices or modems may be connected to set-top box 112 via its USB port. As described in more detail hereinbelow, MURC 110 may receive the user's commands for a selected device 122 and may provide the command and device information to gateway 114, via IoT device server 120. IoT device server 120 may determine the appropriate command and protocol for the device and may provide it, via data network 116, to gateway 114 who, in turn, may instruct set-top box 112 to transmit the appropriate instruction for the selected device 122 using the appropriate command and USB-to-RF device.

As shown in FIG. 1, MURC 110 may also directly control selected device 122, particularly when MURC 110 may be near selected device 122. MURC 110 may utilize its own internal IR or WiFi unit for this. However, in accordance with a preferred embodiment of the present invention, MURC 110 may transmit the user's instructions, using its WiFi or cellphone unit, via IoT device server 120 when MURC 110 may be far from selected device 122, such as when MURC 110 may be away from the home or premises or cannot access the local network.

Figure 3:
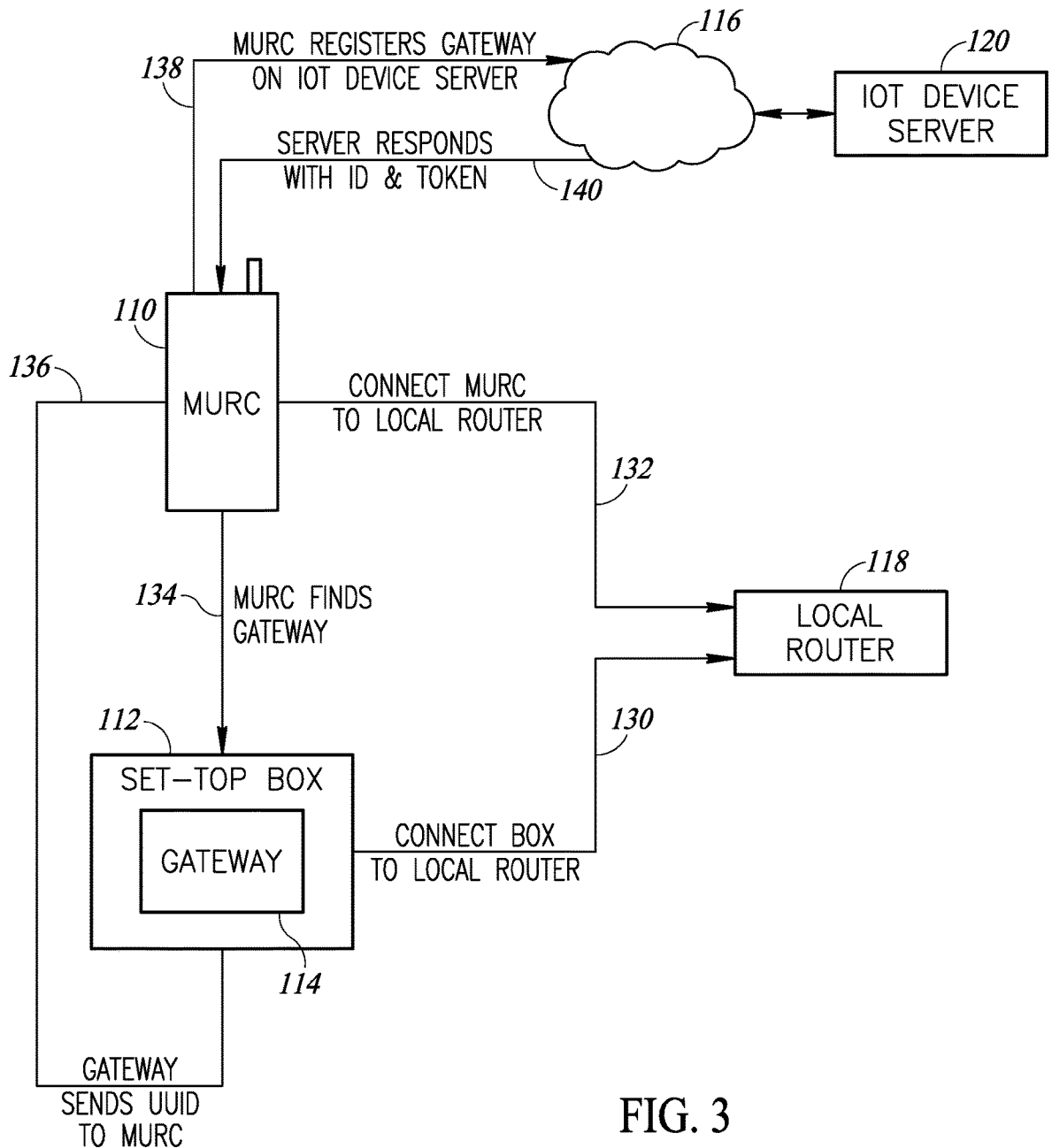
FIG. 3 is a schematic illustration of the operations for installing a gateway for the system of FIG. 1.
Figure 4:
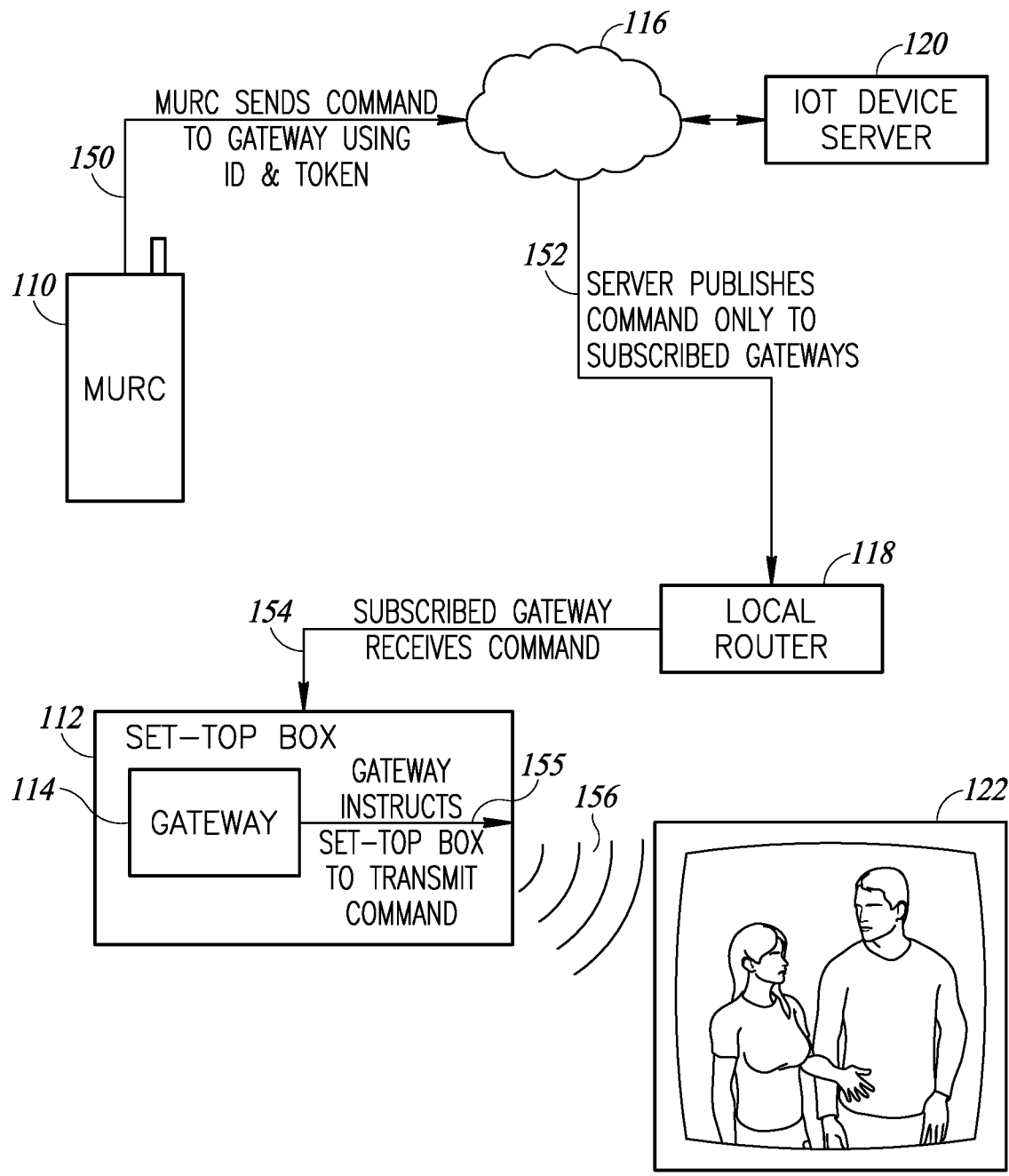
FIG. 4 is a schematic illustration of the operations for sending an instruction to an IoT device in the system of FIG. 1.
Figure 5:
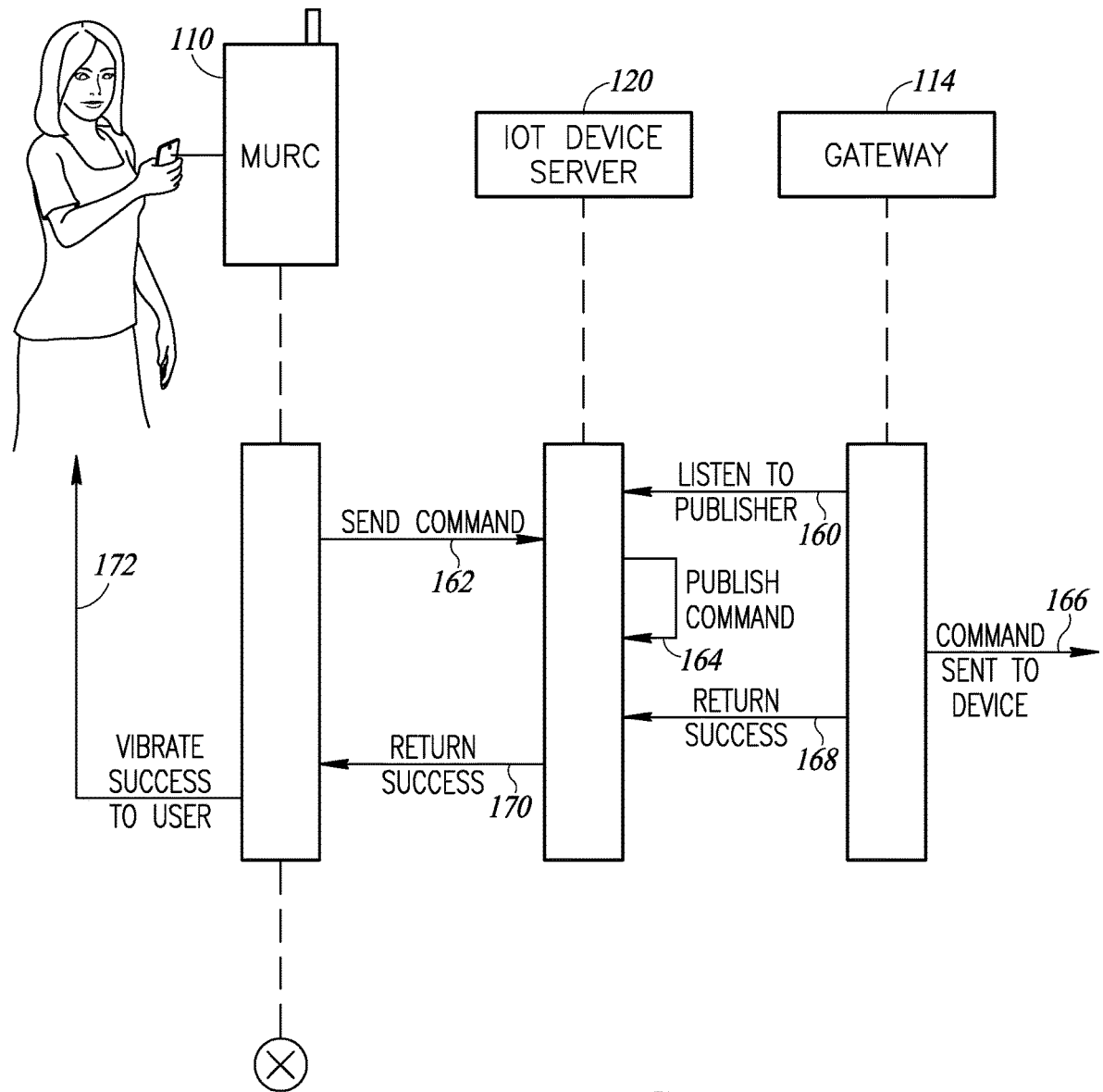
FIG. 5 is a timing diagram illustration of the command operation between elements of the system of FIG. 1.

The full operation is shown in FIGS. 3, 4 and 5, to which reference is now made, where FIG. 3 illustrates the operations for installing gateway 114 in a home, office or other premises, FIG. 4 illustrates the operations for sending an instruction to an IoT device and FIG. 5 illustrates the command operation between MURC 110, IoT device server 120 and gateway 114.

To install gateway 114, a user may first (step 130) connect set-top box 112 to local router 118, in accordance with the specific protocol of local router 118. This may provide an internet connection to set-top box 112. Once the connection is active, the user may connect (step 132) MURC 110 to local router 118, using the communication unit of the mobile device on which MURC 110 is installed.

Once both set-top box 112 and MURC 110 are connected to local router 118, MURC 110 may search (step 134) the connected devices to find the set-top box or boxes 112 connected to local router 118 and may request to join gateway 114. In turn, gateway 114 may transmit (step 136) its UUID (universally unique identifier) to MURC 110 and, in step 138, MURC 110 may register the UUID of gateway 114 with IoT device server 120. Finally, in step 140, IoT device server 120 may respond to MURC 110 with a gateway_id and token for gateway 114.

When a user selects a command for a particular device, MURC 110 may transmit (step 150, FIG. 4) the associated command, protocol, device ID and gateway_id and token for gateway 114 to IoT device server 120, via data network 116. IoT device server 120 may then publish (step 152) the command and protocol, with the device ID and gateway information, only to subscribed gateways 114. The relevant gateway 114 may receive (step 154) the command, via its router 118, and may then instruct its set-top box 112 to issue (step 156) the command to the relevant device using the appropriate protocol and modem. The associated IoT device 122 will receive the command and will perform the selected action.

FIG. 5 is a timing diagram for the send IR command flow. It shows the operations of MURC 110, IoT device server 120 and gateway 114. Initially (arrow 160), gateway 114 may be in or move to a state of listening to a publisher, such as IoT server 120. At some point (i.e. when the user selects a command), MURC 110 may send (arrow 162) the command to IoT server 120 which, in turn, may publish (arrow 164) the command to all of its associated gateways 114.

The relevant gateway 114 may send (arrow 166) the command to the relevant device 122 and may return (arrow 168) a success signal to IoT server 120 which, in turn, may transmit (arrow 170) a success signal to MURC 110 which, in turn, may activate (arrow 172) a vibration notification to indicate to the user that the command was successfully implemented.

Gateway 114 may be implemented in any suitable manner. For example, it may comprise an OCF discovery server which may be utilized during step 134 to wait for and receive a connection request from MURC 110 and to transmit back, such as by a http post message or a COAP message, the UUID of gateway 114. Gateway 114 may store its id and token in persistence memory so that they will not be deleted while gateway 114 is "resting".

Arrow 160 of FIG. 5 shows gateway 114 registering to receive commands published by IoT server 120. This may be performed via a pubsub (publish/subscribe) operation where gateway 114 publishes a request to received publications (arrow 160) and IoT server 120 responds with a command (arrow 164). The command may include the command protocol, modem type and the command code.

Gateway 114 may transmit the notification that the command has been transmitted only in response to a publication request by IoT server 120. Such a request may include the command protocol, modem type and the command code and gateway 114 may respond with the appropriate response (success or lack thereof).

It will be appreciated that MURC 110 and gateway 114 may communicate with each other through IoT device server 120. Moreover, any person of a home or other premises which has a mobile device may download the "app" and may register with gateway 114. Thus, multiple people, such as family members may operate devices in the home or premises with multiple MURCs 110.

It will be appreciated that gateway 114 may implement the OCF protocol for IoT devices and may use this to connect to IoT devices 122. When a new IoT device 122 is installed in the premises, the IoT device may register with gateway 114 by providing its commands and other information to gateway 114. Gateway 114 may determine which one of its agents, described in more detail hereinbelow, may communicate with the device and may be responsible to provide its information to IoT server 120. In accordance with a preferred embodiment of the present invention, gateway 114 may comprise an OCF on-boarding unit which may support connection to IoT devices from various third-party gateway manufacturers which support OCF. Thus, gateway 114 may be manufacturer-independent.

As mentioned hereinabove, to communicate with the smart home sensors and devices implementing other communication protocols, such as the Z-Wave and Zigbee protocols, Zigbee and/or Z-Wave dongles may be plugged into USB ports of set-top box 112. Additionally, gateway 114 may communicate with WiFi-enabled devices using the WiFi network provided by local router 118.

Figure 6:
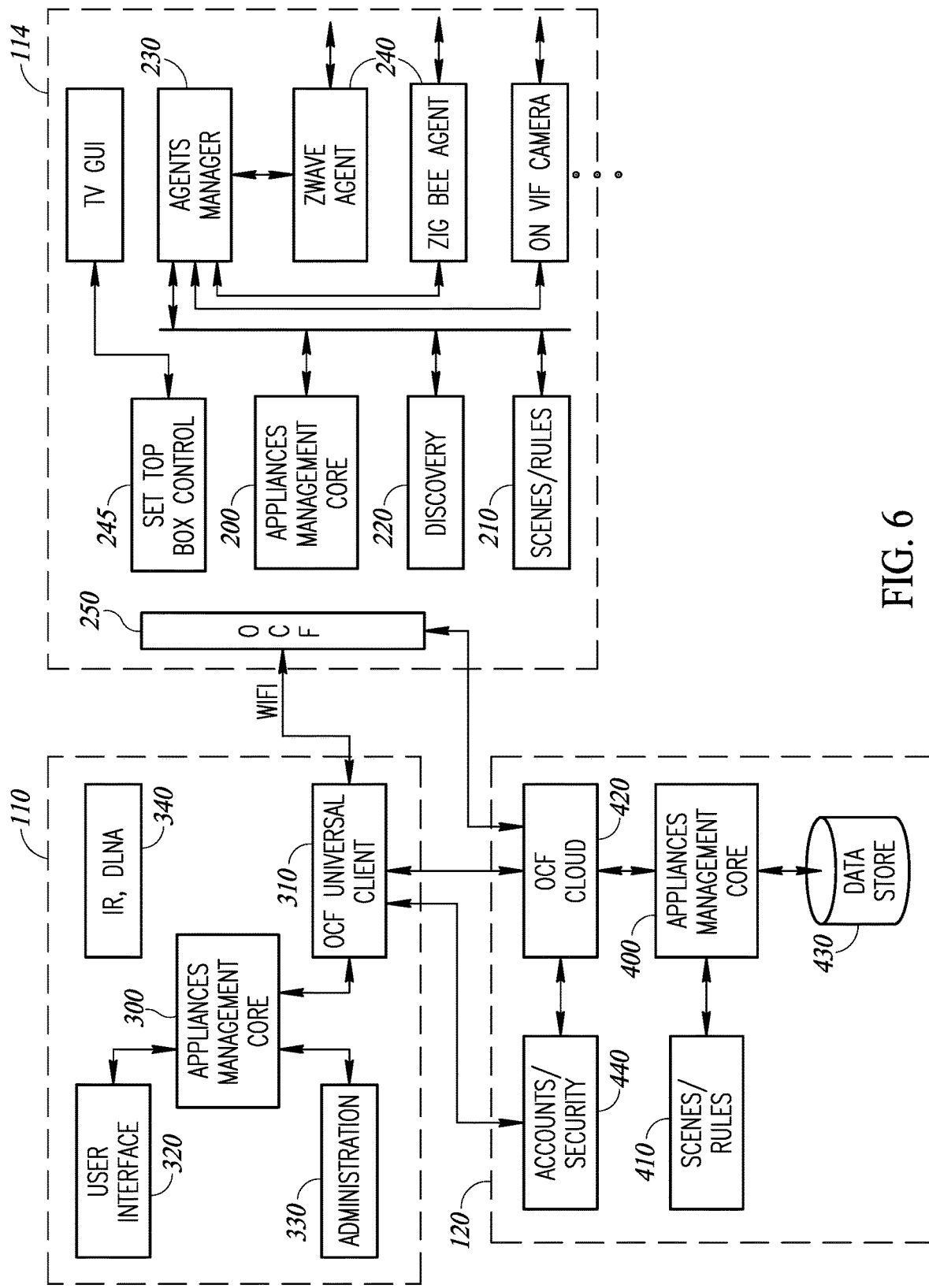
FIG. 6 is a schematic illustration of an exemplary implementation of the system of FIG. 1.

Reference is now made to FIG. 6, which illustrates an exemplary implementation of MURC 110, gateway 114 and IoT server 120.

Gateway 114 may be a software package installed on Android or Linux based set-top boxes or other smart devices 112. It is a smart home/smart building "hub" in charge of establishing communication with various smart home (or smart building) devices, sensors and cameras, and of exposing the information to the MURCs 110.

Since many set-top boxes 112 may be connected to a TV screen, gateway 114, which may be implemented therein, may have a GUI (graphic user interface) for administration and monitoring tasks. However, most users may utilize the GUI on MURC 110 for communication.

Gateway 114 may comprise an appliances management core 200, a scenes/rules unit 210, a discovery unit 220, an agents manager 230 and a plurality of per protocol agents 240. Gateway 114 may comprise a set-top box control unit 245 which may communicate with a television connected to set-top box 112, thereby providing the GUI for gateway 114 as described hereinabove. Gateway 114 may also communicate with MURC 110 and IoT server 120 via an OCF (Open Connectivity Foundation) gateway 250.

Appliances management core 200 may provide the infrastructure for managing the list of smart home or IoT devices currently connected to gateway 114. The list may include the connectivity status of each device, its exact state and supported commands for interaction. Core 200 may exchange the information and commands with agents 240.

Scenes/rules unit 210 may implement an automation functionality in gateway 114 to provide different activation scenarios. Unit 210 may send commands to activate one or more scenes, may monitor the state of devices 122 in order to trigger rules and may implement scheduling functionality based on time. For example, a door opening event could trigger turning on multiple lights at the same time, via sending command to smart sockets and light devices.

Discovery unit 220 may provide a way to recognize devices newly connected to gateway 114, so they can be added to the system in a fully functional way. This includes device detection, authentication and pairing.

Agents manager 230 may provide the infrastructure for plugging new connectivity protocols into gateway 114. Manager 230 may manage the list of agents 240, each of which may be a software plug-in implementing a specific communication protocol with the smart home devices. Manager 230 may support adding more agents 240 as plug-ins, so that no changes in the core modules are required for such an expansion. Each agent 240 may implement connectivity with devices utilizing its protocol, via a dongle providing the relevant modem. For example, there may be a Zigbee agent 240 to implement connectivity with devices utilizing the Zigbee protocol. Other agents 240 may include an OnVif Camera Agent for controlling cameras, an NB-IoT (Narrowband IoT) radio agent, a LoRa agent and a DMX agent for lighting control.

Set-top box control 245 may provide the capability to control set-top box 112 via MURC 110. Control unit 245 may implements commands, mouse and keyboard functionality, as well as and video streaming. As mentioned hereinabove, the TV GUI, which may be operative on the TV monitor, may provide an option to perform both operational and administrative tasks from the TV monitor, in addition to via MURC 110.

It will be appreciated that, in addition to the user interaction via the TV screen, users may interact with gateway 114 from their mobile phones, using MURC 110. MURC 110 may communicate with gateway 114 directly while being on the home WiFi network, so basic communication with the devices may operate without connectivity to data network 116. However, as described hereinabove, MURC 110 may connect to IoT device server 120 when outside of the home network.

MURC 110 may utilize the OCF standard for communication and thus, may directly manage any OCF enabled device. MURC 110 may also control infra-red devices and may support media streaming and other protocols over WiFi.

In addition to sending commands to the devices, MURC 110 may "listen" to the changes in the status of the connected devices. Therefore, its user interface may reflect the latest state, regardless of whether the state was changed by the same client, another client instance, via a scene unit 210, or directly via hardware control. In any case, the latest state will be presented in a timely manner.

MURC 110 may comprise an appliances management core 300, an OCF universal client 310, a user interface 320, an administration unit 330 and an IR/DLNA unit 340. Appliances management core 300 may provide the infrastructure for managing the list of the smart home devices connected to MURC 110. The list may include the connectivity status of each device, its exact state and its supported commands for interaction. Core 300 may provide the infrastructure for the other modules of MURC 110.

OCF universal client 310 may be based on an open source package implementing OCF and may provide communication with gateway 114 or IoT server 120 via the OCF protocol. In addition, due to universality of OCF, client 310 may support a wide range of OCF-based smart home devices.

User interface 320 may provide information on the current state of the connected smart home devices and cameras and may enable commands-based interaction with the devices, over WiFi or via data network 116. In particular, user interface 320 may provide interaction with set-top box 112.

Administration unit 330 may support administration tasks for authorized users, such as configuring scenes, setting permissions, etc. IR/DLNA unit 340 may provide MURC 110 with the ability to communicate directly with some of devices 122 (and not via gateway 114) when appropriate. Administration unit 330 may control infra-red devices, perform media streaming using DLNA and other streaming protocols, and may communicate directly via WiFi using vendor-specific protocols.

IoT device server 120 may primarily provide authorized communication from outside the home WiFi network, may store data from devices 122, and may manage users' identity and security. IoT device server 120 may comprise an appliances management core 400, a scenes/rules unit 410, an OCF cloud module 420, a data store 430 and an accounts/security unit 440.

Appliances management core 400 may manage the list of appliances/devices defined in an account (per home or premises), their properties, state and connectivity. It will be appreciated that gateway 114, server 120 and MURC 110 comprise appliance management cores 200, 300 and 400, respectively. However, core 200 of gateway 114 lists IoT devices of the premises, while core 300 of MURC 110 lists IoT devices of the possibly multiple premises (home, office, friend's homes) where MURC 110 can operate and core 400 of server 120 lists IoT devices of the multiplicity of MURCs 110 and gateways 114 that communicate with it.

Scenes/rules unit 410 may work in coordination with scenes/rules unit 210 of gateway 114 and may handle any automation (or scene) to be performed. Scene/rule unit 410 may handle the delivery of any push notifications related to scenes.

OCF cloud module 420 may be based on the IoTivity cloud module, which is an open source implementation compliant with the OCF. Cloud unit 420 may enable the exposure of the smart home devices to "the cloud" or data network 116. Subject to owner's authorization, the module may communicate with gateway 114 to provide information on the state of devices 122 and may control the devices remotely. By utilizing OCF, MURC 110 may interact with devices 122 over data network 116 in a manner similar to the interaction within the home WiFi.

Data store 430 may maintain any persistent data, such as account data and device data, in a secure and reliable way. Accounts/security unit 440 may manages the database of users, may provide the infrastructure for login, authentication and session management, may keep users' permissions and may provide authentication services for OCF cloud module 420.

Unless specifically stated otherwise, as apparent from the preceding discussions, it is appreciated that, throughout the specification, discussions utilizing terms such as "processing," "computing," "calculating," "determining," or the like, refer to the action and/or processes of a general purpose computer of any type such as a client/server system, mobile computing devices, smart appliances or similar electronic computing device that manipulates and/or transforms data represented as physical, such as electronic, quantities within the computing system's registers and/or memories into other data similarly represented as physical quantities within the computing system's memories, registers or other such information storage, transmission or display devices.

Embodiments of the present invention may include apparatus for performing the operations herein. This apparatus may be specially constructed for the desired purposes, or it may comprise a general-purpose computer or a client/server configuration selectively activated or reconfigured by a computer program stored in the computer. The resultant apparatus when instructed by software may turn the general-purpose computer into inventive elements as discussed herein. The instructions may define the inventive device in operation with the computer platform for which it is desired. Such a computer program may be stored in a computer readable storage medium, such as, but not limited to, any type of disk, including optical disks, magnetic-optical disks, read-only memories (roms), volatile and non-volatile memories, random access memories (rams), electrically programmable read-only memories (eproms), electrically erasable and programmable read only memories (eeproms), magnetic or optical cards, flash memory, disk-on-key or any other type of media suitable for storing electronic instructions and capable of being coupled to a computer system bus.

The processes and displays presented herein are not inherently related to any particular computer or other apparatus. Various general-purpose systems may be used with programs in accordance with the teachings herein, or it may prove convenient to construct a more specialized apparatus to perform the desired method. The desired structure for a variety of these systems will appear from the description below. In addition, embodiments of the present invention are not described with reference to any particular programming language. It will be appreciated that a variety of programming languages may be used to implement the teachings of the invention as described herein.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

What is claimed is:

1. A system for controlling IoT devices in a premises, each IoT device operating according to one of a multiplicity of IoT device protocols, of which at least one of the device protocols is a standard appliance protocol and at least one is a non-standard protocol, the system comprising:
   at least one mobile universal remote controller (MURC) implemented on a mobile device to receive user instructions to at least one of said IoT devices, and to display a current state of at least one IoT device, said MURC operating according to an internal protocol, wherein said internal protocol is a standard appliance protocol; and
   a gateway, implemented in an apparatus having a connection to a data network and having at least one communication unit connected thereto, said gateway to expose all of said IoT devices to said MURC as though said devices operate according to said internal protocol, to receive state information from said at least one IoT device and to pass said state information to said MURC using said internal protocol, said gateway comprising:
      a multiplicity of agents, each implemented as a software plug-in and each implementing a specific one of said multiplicity of IoT device protocols, each said agent to communicate with those of said IoT devices which operate according to its specific IoT device protocol, to provide instructions received from said MURC and to receive state information from its associated said IoT devices; and
      an agent manager to provide an infrastructure for plugging-in and removing said agents from said gateway.

2. The system according to claim 1 and wherein said IoT device protocols are at least one of: WiFi, IR (infra-red), BLE, Zwave, ZigBee, LoRa and NB-IOT.

3. The system according to claim 1 and wherein said at least one communication unit is a USB (universal serial bus) to RF (radio frequency) communication unit.

4. The system according to claim 1 and wherein said MURC also comprises communication units to communicate at least via WiFi and IR directly to at least one of said IoT devices.

5. The system according to claim 1 and wherein said apparatus is one of: a set-top box, a smart appliance, a router or a device having an Internet connection and a USB connection.

6. The system according to claim 1 and wherein said instructions comprise at least a type of protocol and a command code.

7. The system according to claim 1 and wherein said internal protocol is the OCF (Open Connectivity Forum) protocol.

8. The system according to claim 1 and wherein said gateway comprises a discovery unit to enable new devices to be controlled by said gateway.

9. The system according to claim 1 and wherein said gateway comprises scene/rule units to implement activation scenarios for at least one of said IoT devices.

10. The system according to claim 1 and wherein said gateway and MURC comprise appliance management cores to maintain lists of IoT devices being controlled, where said list of said gateway comprises IoT devices of said premises, and said list of said MURC comprises IoT devices of multiple premises where said MURC operates.

11. A method for controlling IoT devices in a premises, each IoT device operating according to one of a multiplicity of IoT device protocols, of which at least one of the device protocols is a standard appliance protocol and at least one is a non-standard protocol, the method comprising:
   operating a MURC according to an internal protocol, wherein said internal protocol is a standard appliance protocol;
   receiving user instructions to at least one of said IoT devices via a mobile universal remote controller (MURC) implemented on a mobile device;
   exposing all of said IoT devices to said MURC as though said devices operate according to said internal protocol, said exposing comprising:
   having a gateway, implemented in an apparatus having a connection to a data network and having at least one communication unit connected thereto, said gateway having a multiplicity of software plug-in agents, each implementing a specific one of said multiplicity of IoT device protocols;
   each said agent communicating with those of said IoT devices which operate according to its specific IoT device protocol to provide instructions received from said MURC and to receive state information therefrom;
   passing commands related to said user instructions from said MURC to said gateway using said internal protocol;
   passing said state information to said MURC using said internal protocol;
   displaying a current state of at least one IoT device on said MURC;
   having an infrastructure for plugging-in and removing said agents from said gateway.

12. The method according to claim 11 and wherein said IoT device protocols are at least one of: WiFi, IR (infra-red), BLE, Zwave, ZigBee, LoRa and NB-IOT.

13. The method according to claim 11 and wherein said commands comprise at least a type of protocol and a command code.

14. The method according to claim 11 and wherein said internal protocol is the OCF (Open Connectivity Forum) protocol.

15. The method according to claim 11 and comprising enabling new devices to be controlled by said gateway.

16. The method according to claim 11 and said gateway implementing activation scenarios for at least one of said IoT devices.

17. The method according to claim 11 and said gateway, and MURC comprising maintaining lists of IoT devices being controlled, where said list of said gateway comprises IoT devices of said premises, and said lists of said MURC comprises IoT devices of multiple premises where said MURC operates.

18. A system for controlling IoT devices in a premises, each IoT device operating according to one of a multiplicity of non-standard IoT device protocols, the system comprising:
   at least one mobile universal remote controller (MURC) implemented on a mobile device to receive user instructions to at least one of said IoT devices, said MURC operating according to an internal protocol, wherein said internal protocol is a standard appliance protocol; and
   a gateway implemented in an apparatus having a connection to a data network and having at least one communication unit connected thereto, said gateway to expose all of said IoT devices to said MURC as though said devices operate according to said internal protocol, said gateway comprising:
   a multiplicity of agents, each implemented as a software plug-in and each implementing one of said non-standard device protocols, each said agent to communicate with those of said IoT devices which operate according to its specific non-standard device protocol and to provide instructions received from said MURC to its associated said IoT devices; and
   an agent manager to provide an infrastructure for plugging-in and removing agents.

* * * * *